Figure 1:
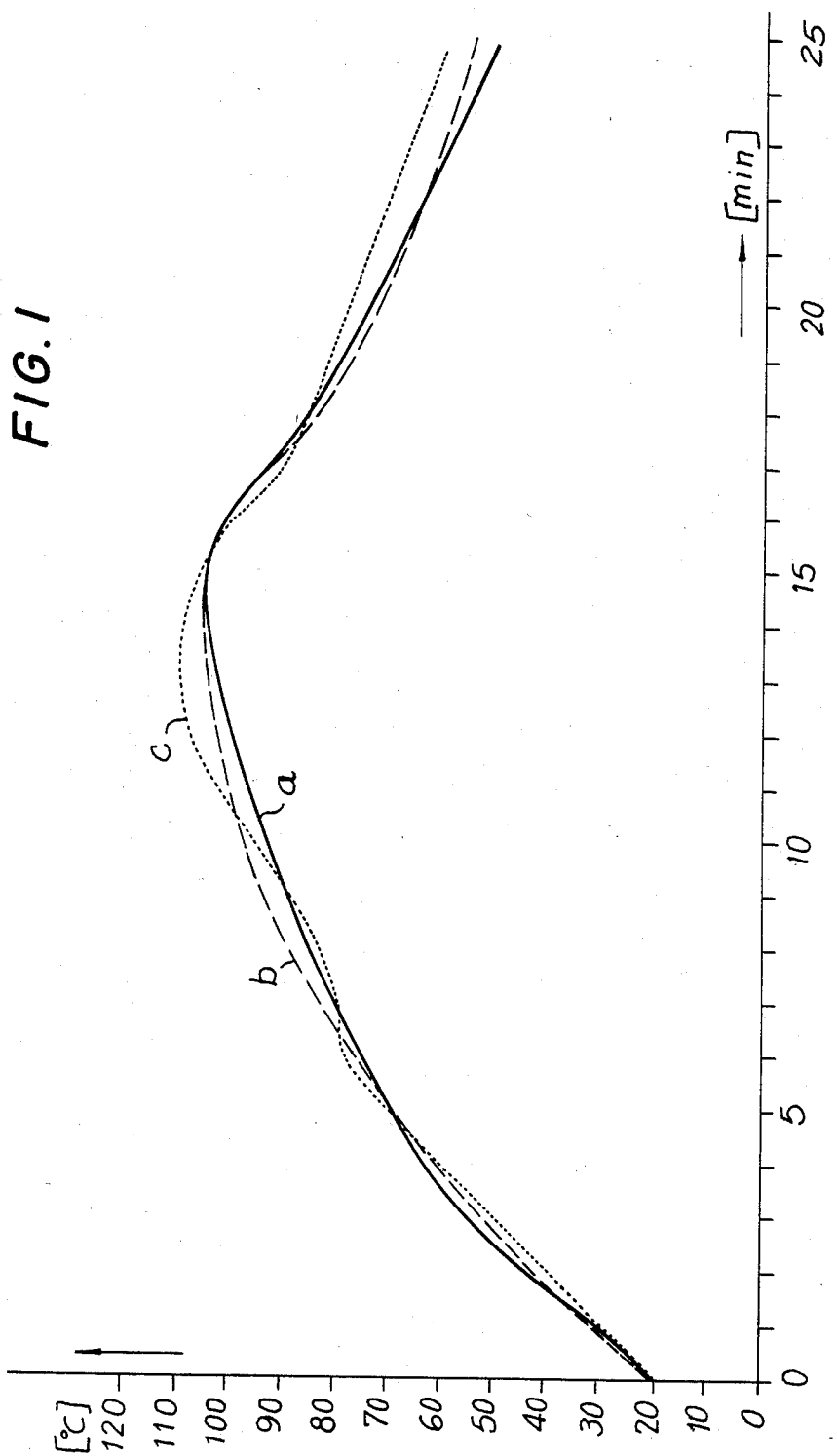

United States Patent [19]

Zimmermann et al.

[11] Patent Number: 4,542,178
[45] Date of Patent: Sep. 17, 1985

[54] PLASTICIZER-CONTAINING POLYVINYL ALCOHOL GRANULES

[75] Inventors: Wolfgang Zimmermann; Albrecht Harréus, both of Kelkheim, Fed. Rep. of Germany

[73] Assignee: Hoechst Aktiengesellschaft, Frankfurt, Fed. Rep. of Germany

[21] Appl. No.: 558,546

[22] Filed: Dec. 2, 1983

Related U.S. Application Data

[60] Continuation of Ser. No. 343,114, Jan. 27, 1982, , which is a division of Ser. No. 211,627, Dec. 1, 1980, Pat. No. 4,323,492, which is a continuation of Ser. No. 22,869, Mar. 21, 1979, abandoned.

[30] Foreign Application Priority Data

Mar. 23, 1978 [DE] Fed. Rep. of Germany ....... 2812684
Sep. 22, 1978 [DE] Fed. Rep. of Germany ....... 2841238

[51] Int. Cl.$^4$ ............ C08L 29/04; C08L 31/04; C08K 5/05; C08K 5/06
[52] U.S. Cl. .................... 524/388; 524/17; 524/19; 524/24; 524/26; 524/35; 524/46; 524/53; 524/322; 524/387; 524/400; 524/503; 524/557; 525/57; 525/58
[58] Field of Search ............ 525/57, 58; 524/17, 524/19, 24, 26, 35, 46, 53, 322, 400, 557

[56] References Cited

U.S. PATENT DOCUMENTS

| | | | |
|---|---|---|---|
| 2,127,896 | 8/1938 | Vohrer | 260/33.4 R |
| 2,138,751 | 11/1938 | Vohrer | 260/29.6 BE |
| 2,177,612 | 10/1939 | Schnabel | 264/123 |
| 2,277,259 | 3/1942 | Schnabel | 260/29.6 BE |
| 2,311,059 | 2/1943 | Lowe | 260/29.6 BE |
| 2,351,301 | 6/1944 | Sonnichsen | 260/29.6 BE |
| 2,399,401 | 4/1946 | Sonnichsen et al. | 260/29.6 BE |
| 2,468,345 | 4/1949 | Porter | 260/29.6 BE |
| 2,491,642 | 12/1949 | Brant | 260/29.6 BE |
| 2,576,820 | 11/1951 | Barnes et al. | 260/29.6 BE |
| 2,737,458 | 3/1956 | Burnham | 260/29.6 BE |
| 3,121,701 | 2/1964 | Ingleby | 260/33.4 R |

FOREIGN PATENT DOCUMENTS

| | | |
|---|---|---|
| 1172043 | 6/1964 | Fed. Rep. of Germany . |
| 1720709 | 7/1971 | Fed. Rep. of Germany . |
| 2302871 | 7/1974 | Fed. Rep. of Germany . |
| 1085611 | 7/1954 | France . |
| 1324826 | 3/1963 | France . |
| 1168757 | 10/1969 | United Kingdom . |
| 1410744 | 10/1975 | United Kingdom . |

Primary Examiner—Lewis T. Jacobs
Assistant Examiner—A. H. Koeckert
Attorney, Agent, or Firm—Curtis, Morris & Safford

[57] ABSTRACT

For the thermoplastic processing of polyvinyl alcohol, the processing temperature must be below the decomposition temperature of the polyvinyl alcohol; this is attained by incorporating plasticizers. For preparing a plasticizer-containing granular polyvinyl alcohol wherein the plasticizer is homogeneously distributed, there is used as starting material a granular polyvinyl alcohol consisting substantially of particles having a definite diameter. The plasticizer is incorporated in the presence of a small amount of water insufficient to dissolve the polyvinyl alcohol, and the temperature is adjusted in a definite manner during the mixing operation. Simultaneous presence of fine particles of a high molecular weight organic compound soluble or dispersible in water is advantageous. The plasticizer-containing granular polyvinyl alcohol is suitable for the manufacture of any shaped articles, especially films and sheets.

17 Claims, 5 Drawing Figures

PLASTICIZER-CONTAINING POLYVINYL ALCOHOL GRANULES

This application is a continuation, of application Ser. No. 343,114, filed 1/27/82. which is a divisional application of Ser. No. 211,627 filed Dec. 1, 1980, now U.S. Pat. No. 4,323,492 dated Apr. 6, 1982, which in turn is a continuation of application Ser. No. 022,869 filed Mar. 21, 1979, now abandoned.

It is known that polyvinyl alcohol (PVAL) cannot be processed thermoplastically without difficulty because it decomposes below the softening temperature. For thermoplastic processing it is therefore necessary to the softening temperature. This is generally achieved by incorporating plasticizers.

Commercial PVAL is generally available in powder form. Homogeneous incorporation of plasticizers into such a product is handicapped by the fact that the PVAL particles, depending on their size, absorb varying amounts of plasticizer. Thermoplastic processing of plasticizer containing PVAL therefore often results in shaped articles wherein the plasticizer is inhomogeneously distributed, which adversely affects the properties of these articles.

The manufacture of plasticizer-containing polyvinyl alcohol has been proposed in German Offenlegungsschrift No. 23 02 871 (British Pat. No. 14 10 744). In this process, the intended homogenization of PVAL and plasticizer is attained by mixing the PVAL wetted and swollen by means of methanol with the plasticizer and subsequently removing the methanol. However, there is no disclosure as to the grain size of the PVAL used. Moreover, the process has the disadvantage of requiring PVAL wetted by methanol for incorporating the plasticizer. Therefore, commercial dry PVAL granules cannot be used.

It is the object of this invention to provide PVAL granules which are pourable and capable of being processed thermoplastically due to their content of plasticizer. A further object is to ensure that the PVAL particles have a substantially uniform and large size, and that the plasticizer contained in these particles is distributed as homogeneously as possible. These and other objects and advantages will be apparent from the specification and claims.

The present invention provides a plasticizer-containing, pourable, tack-free granular polyvinyl alcohol capable of being processed thermoplastically, wherein at least 70 weight % of the granular PVAL consist of particles having a diameter of from 0.8 to 4 mm and containing a plasticizer in homogeneous distribution.

The invention also provides a process for the manufacture of a plasticizer-containing, pourable, tack-free granular polyvinyl alcohol capable of being processed thermoplastically by mixing polyvinyl alcohol granules with a plasticizer, which comprises intensely and homogeneously mixing 100 parts by weight of dry polyvinyl alcohol granules 70% of which at least consist of particles having a diameter of from 0.4 to 4 mm and from 5 to 50 parts by weight of a plasticizer, in the presence of an amount of water insufficient for dissolving the PVAL under normal conditions, and raising and then decreasing the temperature of the mixture during the mixing operation in such a manner that the polyvinyl alcohol particles swell and temporarily agglomerate.

A preferred embodiment of the invention provides a process for the manufacture of a plasticizer-containing, pourable, tack-free granular polyvinyl alcohol capable of being processed thermoplastically by mixing polyvinyl alcohol granules with a plasticizer, which comprises intensely and homogeneously mixing 100 parts by weight of dry polyvinyl alcohol granules of which at least 70% consist of particles having a diameter of from 0.4 to 4 mm and from 5 to 50 parts by weight of a plasticizer, in the presence of an amount of water insufficient for dissolving the PVAL under normal conditions, and raising and then decreasing the temperature of the mixture during the mixing operation in such a manner that the polyvinyl alcohol particles swell and temporarily agglomerate, and wherein the components are mixed in the presence of from 1 to 15 parts by weight of a fine-particle high molecular weight organic compound soluble or dispersible in water and consisting of particles having a diameter not exceeding 300 micrometers ($\mu$m).

The invention additionally provides the granular polyvinyl alcohol obtained according to the above processes.

The PVAL used as starting material in accordance with the invention is prepared in known manner by saponification, preferably by alcoholysis, from polyvinyl esters, preferably polyvinyl acetate (see for example German Pat. No. 17 20 709, which corresponds to British Pat. No. 11 68 757). The 4 weight % aqueous solution of the PVAL has a viscosity of from 4 to 70 mPa·s, preferably 10 to 60 mPa·s (measured at a temperature of 20° C.). The ester number is in the range of from 10 to 250 mg KOH/g, preferably 20 to 200 mg KOH/g.

A characteristic feature of the invention is the use of PVAL granules which consist substantially of particles having a definite size as starting material for the manufacture of the intended plasticizer-containing product. At least 70 weight %, preferably at least 90 weight %, of the starting PVAL granules should consist of particles having a diameter of from 0.4 to 4 mm, preferably 0.6 to 3 mm. The remainder of a maximum 30 weight %, preferably a maximum 10 weight %, of starting material consists substantially of particles having a smaller diameter, which is not disadvantageous because these fine particles, on mixing with the plasticizer, agglomerate nearly completely to form coarse particles. The PVAL granules obtained as final product are tack-free, easily pourable and can be processed thermoplastically. The substantial part thereof, that is at least 70 weight %, preferably at least 90 weight %, consists of particles having a diameter of from 0.8 to 4 mm, preferably 1 to 3.5 mm.

A further characteristic of the invention is the incorporation of the plasticizer into the dry granular PVAL in the presence of water in such an amount which under normal conditions is insufficient for dissolving the PVAL used. Depending on the kind of PVAL, this amount of water is from 2 to 40 weight %, preferably 4 to 30 weight % (relative to the polyvinyl alcohol). Removal of the water still present after completion of the mixing operation is not required.

Suitable plasticizers are above all aliphatic polyols having a boiling point above 250° C., especially bihydric to hexahydric alkanols having from 2 to 6 carbon atoms; bi- or trihydric alkanols are preferably used. Examples are ethyleneglycol, glycerol, trimethylolpropane, neopentylglycol and sorbitol. Instead of a single plasticizer, a mixture of different plasticizers may be used. The amount of plasticizer to be incorporated is in the range of from 5 to 50 weight %, preferably 10 to 30 weight % (relative to the polyvinyl alcohol).

Temperature control during the mixing operation is very important for the process of the invention. The temperature of the mixture must be adjusted in such a manner that the starting PVAL particles swell and agglomerate temporarily. To achieve this, the temperature of the mixture first has to be gradually raised from the starting room temperature to a maximum and then decreased again, thus causing the formation of loose PVAL agglomerates during the temperature rise which easily decompose after the maximum has been passed. The maximum temperature does not exceed 140° C. and is preferably in the range of from 100° to 130° C.; in the cooling phase the temperature is reduced to 40° to 70° C., preferably 35° to 60° C. The temperature is raised and decreased preferably in about similar periods of time.

A special embodiment of the invention is characterized by mixing the granular polyvinyl alcohol and the plasticizer in the presence of from 1 to 15 parts by weight, preferably 2 to 12 parts by weight (relative to 100 parts of granular polyvinyl alcohol) of a fine-particle high molecular weight organic compound soluble or dispersible in water, the particle diameter of which is generally a maximum 300 μm, preferably from 0.1 to 300 μm. The average polymerization degree (average weight $\bar{p}_w$) of this high molecular weight compound is at least 200, and preferably from 300 to 5000.

The high molecular weight compound may be natural or synthetic. Suitable are, for example, starch and starch derivatives, cellulose derivatives such as methyl cellulose and carboxyhydroxy cellulose, casein and gelatin, and especially vinyl polymers. Suitable vinyl polymers are for example polyvinyl alcohol itself and derivatives thereof, especially polyvinyl esters such as polyvinyl acetate and polyvinyl propionate, polyvinyl acetals such as polyvinylformal or polyvinylbutyral. Copolymers of different vinyl compounds may likewise be used, preferably copolymers of vinyl acetate with ethylene, maleic acid diesters, fumaric acid diesters, acrylic acid esters, methacrylic acid esters or acrylonitrile, the alcohol component of the cited esters having preferably from 2 to 8 carbon atoms.

The high molecular weight compound is generally used in the form of a powder which is obtained preferarably by spray-drying of a corresponding solution or dispersion. The diameter of the powder particles is advantageously from 10 to 300 micrometers, preferably 20 to 200 micrometers. According to an especially preferred embodiment of the process of the invention the high molecular weight compound is used in the form of an aqueous dispersion. In this case, the particle diameter of the disperse compound is advantageously in the range of from 0.1 to 10 micrometers, preferably in the range of from 0.2 to 8 micrometers.

Preferably, the high molecular weight compound is added to the PVAL granules before adding the plasticizer; alternatively, it may be added to the granular PVAL simultaneously or in admixture with the plasticizer.

Depending on the kind and the amount of the components and the kind of mixing equipment, a period of from 10 minutes to 3 hours is required for the entire mixing operation. While mixing the dry PVAL particles with the liquid plasticizer/water mixture the particles swell, which facilitates diffusion of the plasticizer into the interior of the particles.

The plasticizer must be distributed as homogeneously as possible in the PVAL particles. This is attained by using such mixing equipment which ensures intense and permanent intermixing of the components. Especially suitable are forced circulation mixers having vertically or horizontally arranged agitators, and planetary mixers. Advantageously, the mixers are provided with heating and cooling devices. The above temperature rise is ensured by friction or jacket heating, depending on the kind of mixing equipment.

The process of the invention may likewise be carried out continuously, for example, in horizontally positioned reaction tubes with a paddle agitator or screw, or in continuously operating kneaders, each being provided with the necessary heating and cooling zones.

Auxiliaries facilitating the processing of the granular PVAL may also be incorporated into the granules, especially lubricants, such as stearic acid, waxes, polyethyleneglycols having a molecular weight of from 400 to 20,000, fine-particle silicic acid and alkaline earth stearates, preferably calcium stearate, furthermore heat stabilizers and dyestuffs. The total amount of such auxiliaries is 3 weight % at most, preferably from 0.04 to 1.0 weight % (relative to the polyvinyl alcohol).

The granular PVAL of the invention can be molded thermoplastically without any difficulty, for example, by compression molding, injection molding and extrusion, and it is suitable for the manufacture of any shaped articles, for example, plates, tubes, profiles, fibers and, especially, films and sheets.

The easy processability of the granular PVAL of the invention is above all due to the fact that by mixing starting material and plasticizer in the presence of a fine-particle high molecular weight organic compound, the PVAL particles become uniform, which considerably facilitates plastication during the processing. Moreover, some of the high molecular weight compounds have a pronounced lubricating effect.

The following examples and the corresponding diagrams illustrate the invention.

FIG. 1 indicates the temperature curve of the process according to examples 1 to 3.

FIGS. 2 to 5 demonstrate the effect of the process of the invention, that is, increase and uniformization of the size of the PVAL granules; they indicate the grain size distribution of the corresponding starting materials (curve 1) and the final product (curve 2) determined by sieve analysis. There are plotted on the abscissa the particle diameter (mm) and on the ordinate the sieve passage (%); the inclination of the curves being a measure for the uniformity of the PVAL particles.

EXAMPLE 1

6 kg of a commercial granular PVAL, the particles of which have a diameter in the range of from 0.6 to 3 mm, which has an ester number of 140 mg KOH/g and the 4 % aqueous solution of which has a viscosity of 18 mPa·s, are introduced into a 35 liter forced circulation mixer. With agitation and at room temperature, a mixture of 750 g of glycerol and 240 g of water is added within 1 minute, the agitation speed being 1,200 rpm. After about 4 minutes the PVAL particles begin to agglomerate, and after about 17 minutes the agglomerates are broken up or crushed again. During the mixing operation, the temperature rises to 105° C. within 15 minutes, and it is reduced within 10 minutes to 50° C. by slowing down the agitation speed to 600 rpm and by jacket cooling (temperature curve: see FIG. 1, curve a).

Subsequently, the plasticizer-containing granular PVAL is let off. It consists of particles having a diameter in the range of from 1 to 4 mm, it is well pourable, and it can be processed on a single-screw extruder to give a completely perfect blown film having a thickness of 30 μm.

Repetition of this Example in a 160 liter forced circulation mixer gives identical results.

EXAMPLE 2

Example 1 is repeated with the following exceptions: The starting PVAL particles have a diameter in the range of from 0.6 to 2.5 mm, the PVAL has an ester number of 90 mg KOH/g and the viscosity of its 4% aqueous solution is 30 mPa·s. The amount of glycerol is 1,050 g and that of water 300 g. After about 3 minutes the PVAL particles begin to agglomerate, and after about 16 minutes the agglomerates are broken up or crushed again. The temperature rises during the mixing operation to 105° C. (temperature curve see FIG. 1, curve b). The plasticizer-containing PVAL granules have a diameter in the range of from 0.9 to 3.5 mm, and they can be processed according to Example 1 to give a completely perfect blown film.

EXAMPLE 3

Example 1 is repeated with the following exceptions: The PVAL particles have a diameter in the range of from 0.5 to 2.5 mm, the PVAL has an ester number of 20 mg KOH/g and the viscosity of the 4% aqueous solution is 20 mPa·s. The amount of glycerol is 1,500 g and that of water 900 g. In addition, 3 g of calcium stearate are introduced into the mixer. After about 6 minutes, the PVAL particles start to agglomerate, and after about 16 minutes the agglomerates are crushed again. During the mixing operation, the temperature rises to 80° C. and is raised further to 110° C. by additional heating (temperature curve see FIG. 1, curve c). The plasticizer-containing granular PVAL consists of particles having a diameter in the range of from 0.9 to 3.3 mm, and it can be processed according to Example 1 to give a completely perfect blown film.

EXAMPLE 4

1 kg of the PVAL granules used in Example 1 are introduced into a 5 liter mixer having a planetary agitator, and mixed under the conditions of Example 1 with a solution of 100 g of trimethylolpropane and 2 g of polyethyleneglycol (molecular weight 1,500) in 30 g of water. Heating is ensured in this case be jacket heating. The temperature curve is identical to that of Example 1, and the plasticizer-containing granular PVAL corresponds to that obtained according to Example 1.

EXAMPLE 5

Figure 2:
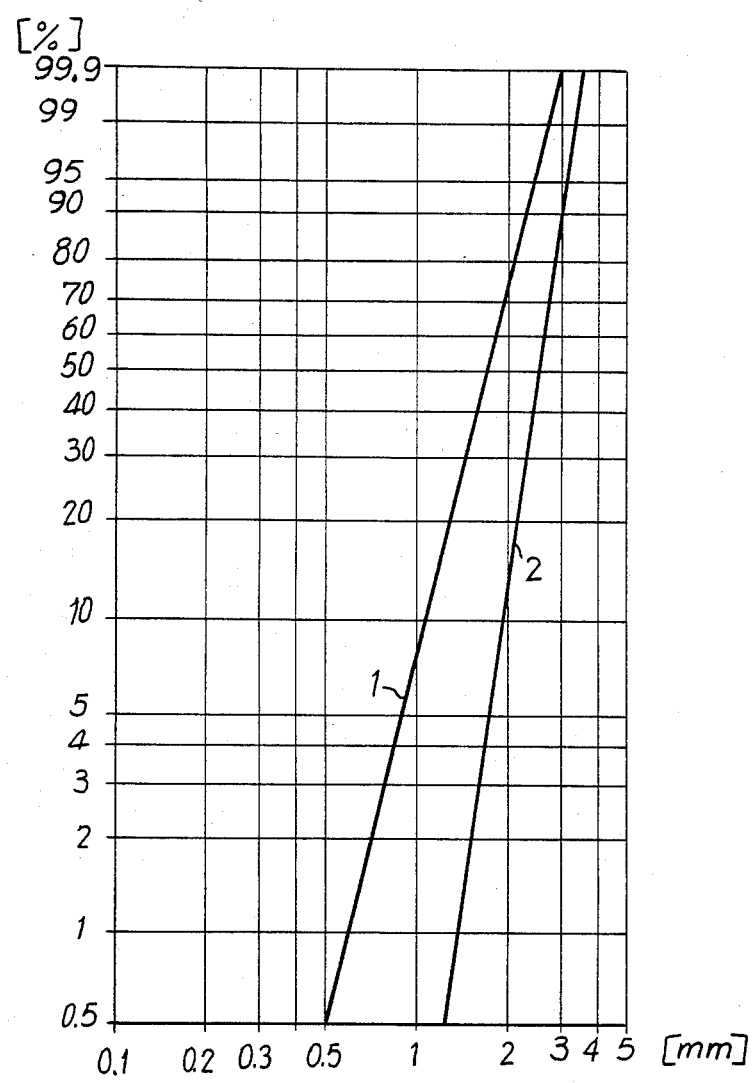

A mixture of 6.0 kg of a commercial granular PVAL (ester number: 90 mg KOH/g, viscosity of the 4 weight % aqueous solution 30 mPa·s, particle diameter 0.5 to 3 mm) and 0.3 kg of a polyvinyl acetate powder (average polymerization degree 1,500, particle diameter 20 to 200 μm) is introduced into the mixer used in Example 1. With agitation (1,200 rpm) and at room temperature, a mixture of 1.2 kg of glycerol and 0.3 kg of water is added to the above mixture. After about 3 minutes the PVAL particles start to agglomerate, and after about 16 minutes the agglomerates are crushed again. During the mixing operation, the temperature rises to 105° C. within 15 minutes, and is reduced within 10 minutes to 50° C. by jacket cooling and reduction of the agitation speed to 600 rpm. Subsequently, the plasticizer-containing granular PVAL is let off which consists of particles having a diameter in the range of from 1.2 to 3.7 mm. It is well pourable and tack-free. The grain size distribution of the starting material (curve 1) and the final product (curve 2) is shown in FIG. 2.

EXAMPLE 6

Figure 3:
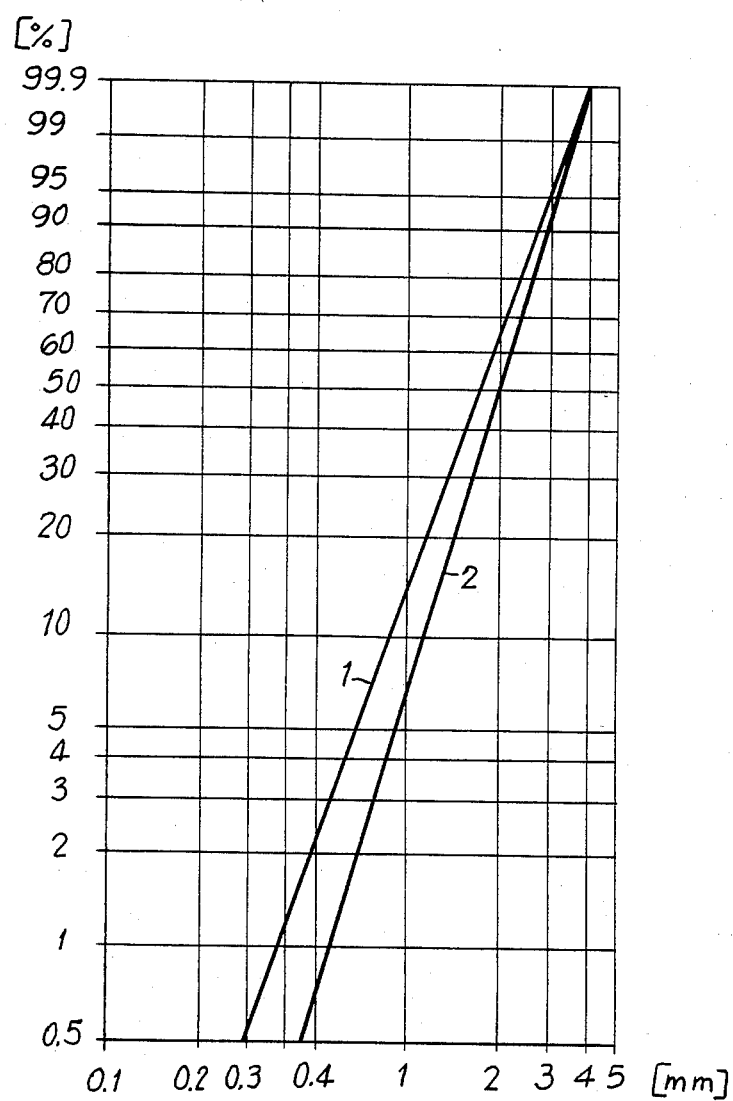

6.0 kg of a commercial granular PVAL (ester number 20 mg KOH/g, viscosity of the 4 weight % aqueous solution 20 m.Pa·s, particle diameter 0.6 to 2.5 mm) are introduced into the mixer used in Example 1. With agitation (1,200 rpm) and at room temperature, a mixture of 1.05 kg of glycerol, 0.3 kg of water and 1.2 kg of a 50 weight % aqueous polyvinyl acetate dispersion (average polymerization degree 1,500, particle diameter 0.6 to 6.0 μm) is added. After about 3 minutes the PVAL particles start to agglomerate, and after about 16 minutes the agglomerates are crushed again. During the mixing operation, the temperature is raised with 10 minutes to 110° C. and then reduced within 15 minutes to 50° C. by jacket cooling and reduction of the agitation speed to 600 rpm. Subsequently, the plasticizer-containing granular PVAL is let off which consists of particles having a diameter in the range of from 0.45 to 4.0 mm. It is easily pourable and tack-free. The grain size distribution of the starting material (curve 1) and the final product (curve 2) is shown in FIG. 3.

EXAMPLE 7

Figure 4:
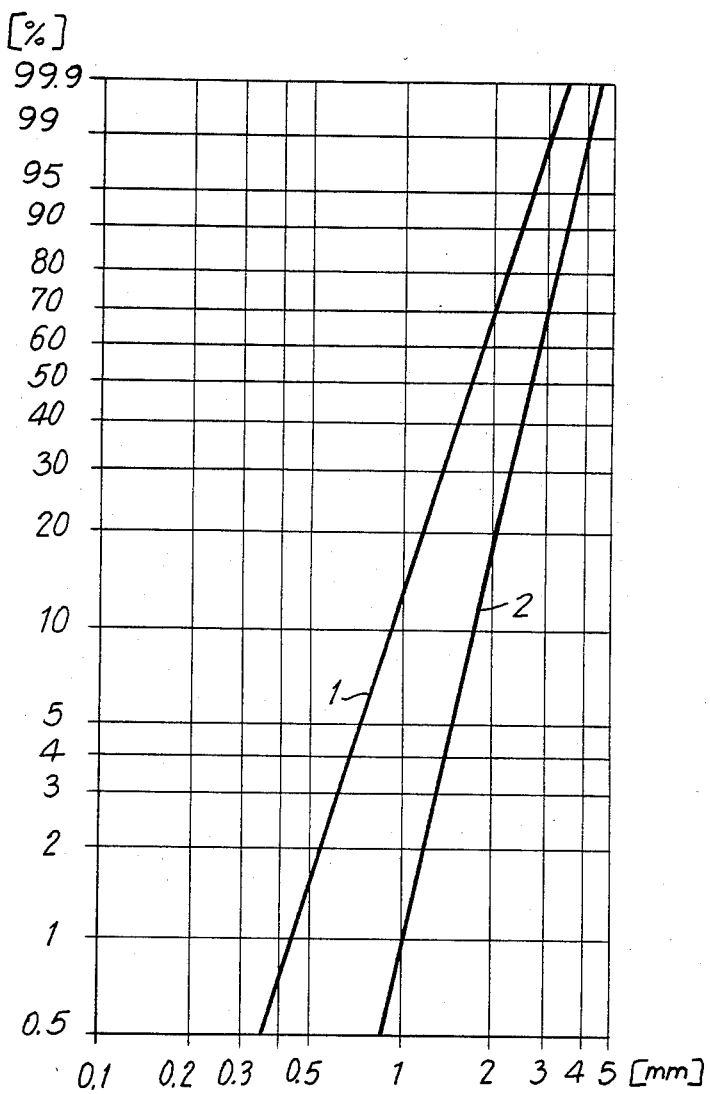

A mixture of 6.0 kg of a commercial granular PVAL (ester number 140 mg KOH/g, viscosity of the 4 weight % aqueous solution 18 mPa·s, particle diameter 0.4 to 4.0 mm) and 0.15 kg of a polyvinyl butyral powder (average polymerization degree 1,600, particle diameter 100 to 200 μm) is introduced into the mixer used in Example 1. With agitation (1,200 rpm) and at room temperature, a mixture of 0.75 kg of glycerol and 0.24 kg of water is added. After about 3 minutes the PVAL Particles start to agglomerate, and after about 16 minutes the agglomerates are crushed again. During the mixing operation, the temperature rises to 105° C. within 15 minutes and it is reduced to 50° C. within 10 minutes by means of jacket cooling and reduction of the agitation speed to 600 rpm. Subsequently, the plasticizer-containing PVAL granules are let off which have a diameter in the range of from 0.9 to 4.0 mm, are well pourable and tack-free. The grain-size distribution of the starting material (curve 1) and the final product (curve 2) is shown in FIG. 4.

EXAMPLE 8

Figure 5:
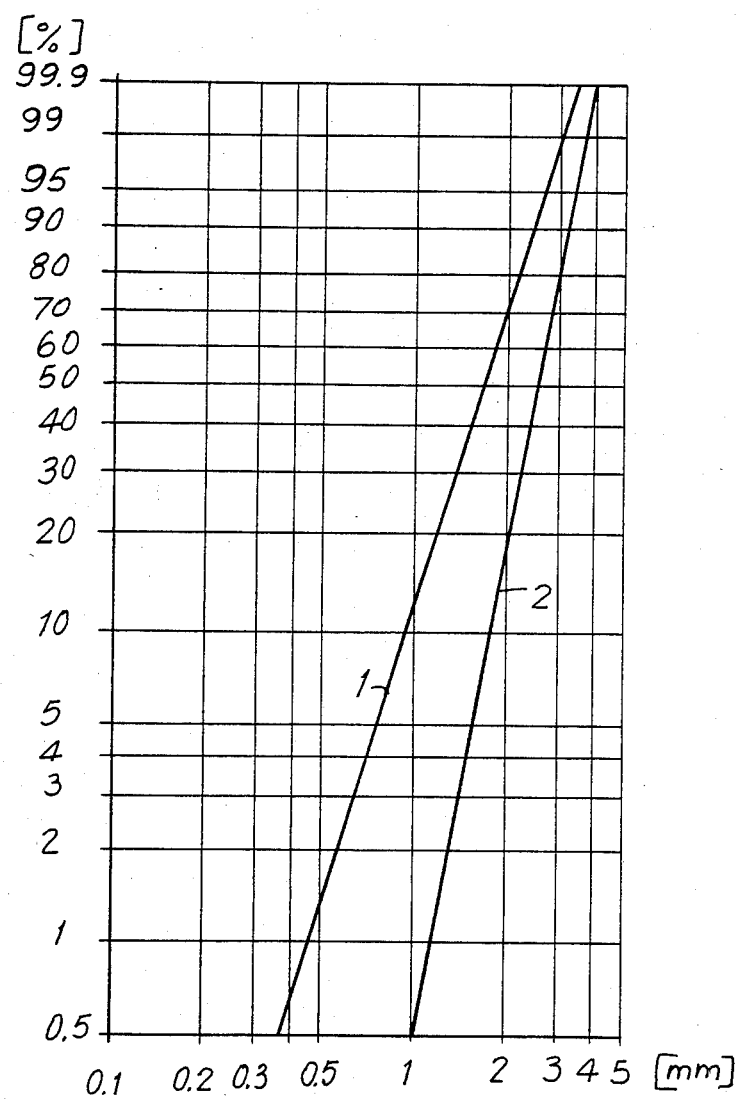

6.0 kg of a commercial granular PVAL (ester number 140 mg KOH/g, viscosity of the 4 weight % aqueous solution 18 mPa·s, particle diameter 0.4 to 4.0 mm) are introduced into the mixer used in Example 1. With agitation (1,200 rpm) and at room temperature, a mixture of 0.75 kg of glycerol, 0.3 kg of water and 0.12 kg of a 50 weight % aqueous vinyl acetate/dibutyl maleate copolymer dispersion (monomer ratio 50:50, average polymerization degree 1,200, particle diameter 0.6 to 6.0 μm) is added. After about 3 minutes the PVAL particle start to agglomerate, and after about 16 minutes the agglomerates are crushed again. During the mixing operation the temperature rises within 13 minutes to 110° C. and is then reduced to 50° C. within 12 minutes by jacket cooling and reduction of the agitation speed to 600 rpm. The plasticizer-containing PVAL granules are then let off which have a diameter in the range of from 1.0 to 4.0 mm, are easily pourable and tack-free. The grain size distribution of the starting material (curve 1) and the final product (curve 2) is shown in FIG. 5.

What is claimed is:

1. A plasticizer-containing, pourable and tack-free granular polyvinyl alcohol composition comprising polyvinyl alcohol, at least 90% of the plasticized polyvinyl alcohol granules being from 0.8 to 4 mm in diameter; a plasticizer homogeneously distributed therein, the plasticizer being present in an amount of 10 to 30% by weight relative to the unplasticized polyvinyl alcohol granules; and further containing, distributed homogeneously therein, a fine particle high molecular weight organic compound, in an amount of 2 to 12% by weight relative to the unplasticized polyvinyl alcohol granules, which is soluble or dispersible in water.

2. The composition of claim 1, wherein the high molecular weight organic compound is a starch, starch derivative, cellulose, cellulose derivative, casein, gelatin or vinyl polymer.

3. The composition of claim 2, wherein the cellulose derivative is methyl cellulose or carboxyhydroxy cellulose.

4. The composition of claim 2, wherein the vinyl polymer is polyvinyl ester or polyvinyl acetal.

5. The composition of claim 2, wherein the vinyl polymer is a copolymer of vinyl acetate with ethylene, maleic acid diesters, fumaric diesters, acrylic acid diesters, methacrylic acid esters or acrylonitrile, the alcohol portion of the esters having 2 to 8 carbon atoms.

6. The composition of claim 1, wherein the high molecular weight compound is in the form of powder particles having diameters of from 10 to 300 micrometers.

7. The composition of claim 6 wherein the diameters of the high molecular weight compound particles are from 20 to 200 micrometers.

8. The composition of claim 1, wherein the high molecular weight compound is in the form of an aqueous dispersion in which the particle diameter of the disperse compound is from 0.1 to 10 micrometers.

9. The composition of claim 8, wherein the particle diameter is from 0.2 to 8 mircometers.

10. The composition of claim 1, further including up to 3% by weight of an auxiliary comprising a heat stabilizer, a dyestuff and a lubricant selected from the group consisting of stearic acid, wax, polyethylene glycol having a molecular weight of from 400 to 20,000, silicic acid and an alkaline earth stearate, or a combination thereof.

11. The composition of claim 10, wherein the auxiliary or auxiliaries are present in amounts of from 0.4 to 1.0% by weight relative to the polyvinyl alcohol granules.

12. The composition of claim 1, wherein the plasticizer is an aliphatic polyol having a boiling point above 250° C.

13. The composition of claim 12, wherein the plasticizer is ethyleneglycol, glycerol, trimethylolpropane, neopentylglycol or sorbitol.

14. The composition of claim 1, wherein the plasticizer is glycerol and further including a high molecular weight compound which comprises a polyvinylacetate which is dispersible in water.

15. The composition of claim 1, wherein at least 70 weight % of the polyvinyl alcohol granules consist of particles having a diameter of 1 to 3.5 mm.

16. The composition of claim 15, wherein at least 90% of the polyvinyl alcohol granules consist of particles having a diameter of 1 to 3.5 mm.

17. The composition of claim 1, wherein the fine particle high molecular weight organic compound has a particle diameter size of from 0.1 to 300 μm and a polymerization degree (average weight) of from 300 to 5000; and the composition further contains auxiliaries, in an amount from 0.04 to 1% by weight, including a heat stabilizer, a dyestuff and a lubricant selected from the group consisting of stearic acid, wax, polyethyleneglycol having a molecular weight of from 400 to 20,000, silicic acid and an alkaline earth stearate.

* * * * *